United States Patent [19]
Jolliff et al.

[11] Patent Number: 6,010,423
[45] Date of Patent: *Jan. 4, 2000

[54] REVERSIBLE VARIABLE SPEED TRANSMISSION AND TRANSAXLE HAVING PRESSURE COMPENSATING FLOW METERING DEVICE

[75] Inventors: Norman E. Jolliff; Joseph V. Miller, both of Salem, Ind.

[73] Assignee: Tecumseh Products Company, Tecumseh, Mich.

[ * ] Notice: This patent is subject to a terminal disclaimer.

[21] Appl. No.: 09/135,852

[22] Filed: Aug. 18, 1998

[51] Int. Cl.⁷ .................................................. F16H 47/00
[52] U.S. Cl. .................................................................. 475/93
[58] Field of Search ............................ 475/72, 73, 78, 475/80, 89, 93, 94, 295, 296; 74/665 GB, 732.1, 810.1

[56] References Cited

U.S. PATENT DOCUMENTS

| | | |
|---|---|---|
| 864,243 | 8/1907 | Hovey .................................... 475/207 |
| 1,161,066 | 11/1915 | Minor . |
| 1,689,537 | 10/1928 | Sorensen . |
| 2,143,711 | 1/1939 | Murray . |
| 2,212,046 | 8/1940 | Ross . |
| 2,232,252 | 2/1941 | Mathey . |
| 2,281,384 | 4/1942 | Ross . |
| 2,372,702 | 4/1945 | Armentrout . |
| 2,373,138 | 4/1945 | Moritin . |
| 2,392,226 | 1/1946 | Butterworth, Jr. et al. . |
| 2,464,494 | 3/1949 | Ferreira . |
| 2,653,487 | 9/1953 | Martin et al. . |
| 2,743,625 | 5/1956 | Moffett . |
| 2,782,660 | 2/1957 | Davis . |
| 2,928,513 | 3/1960 | Rhodes et al. . |
| 2,960,890 | 11/1960 | Davis . |
| 3,262,336 | 7/1966 | Jackson . |
| 3,362,246 | 1/1968 | Bergstedt . |
| 3,447,400 | 6/1969 | Serniuk . |
| 3,482,471 | 12/1969 | Crossman . |
| 3,540,296 | 11/1970 | Hostutler . |
| 3,678,786 | 7/1972 | Szekely . |
| 3,847,108 | 11/1974 | Shimanckas . |
| 3,924,490 | 12/1975 | Mills . |
| 4,078,452 | 3/1978 | Rosler . |
| 4,123,857 | 11/1978 | Enters et al. . |
| 4,341,132 | 7/1982 | Burdick . |
| 4,726,256 | 2/1988 | Von Kaler et al. ........................ 74/689 |
| 4,729,261 | 3/1988 | Tervola . |
| 4,861,295 | 8/1989 | McElroy, Jr. et al. . |
| 5,059,163 | 10/1991 | Von Greyerz ........................... 475/296 |
| 5,512,021 | 4/1996 | Shash . |
| 5,860,884 | 1/1999 | Joliff ........................................ 475/89 |

*Primary Examiner*—Dirk Wright
*Attorney, Agent, or Firm*—Baker & Daniels

[57] ABSTRACT

A variable speed transmission including a rotatable input member connectable to a drive source, a pump for pumping fluid through a conduit, a gear train including an epicyclic gear train operatively coupled to the input member and the pump, and a rotatable output member selectively operatively connected to either a forward or a reverse drive gear, wherein the output member has a forward drive ratio corresponding with its connection to the forward drive gear and a different, reverse drive ratio corresponding with its connection to the reverse drive gear. The transmission may also include a pressure compensating flow metering device for regulating the pressure of fluid flowing through said conduit.

34 Claims, 9 Drawing Sheets

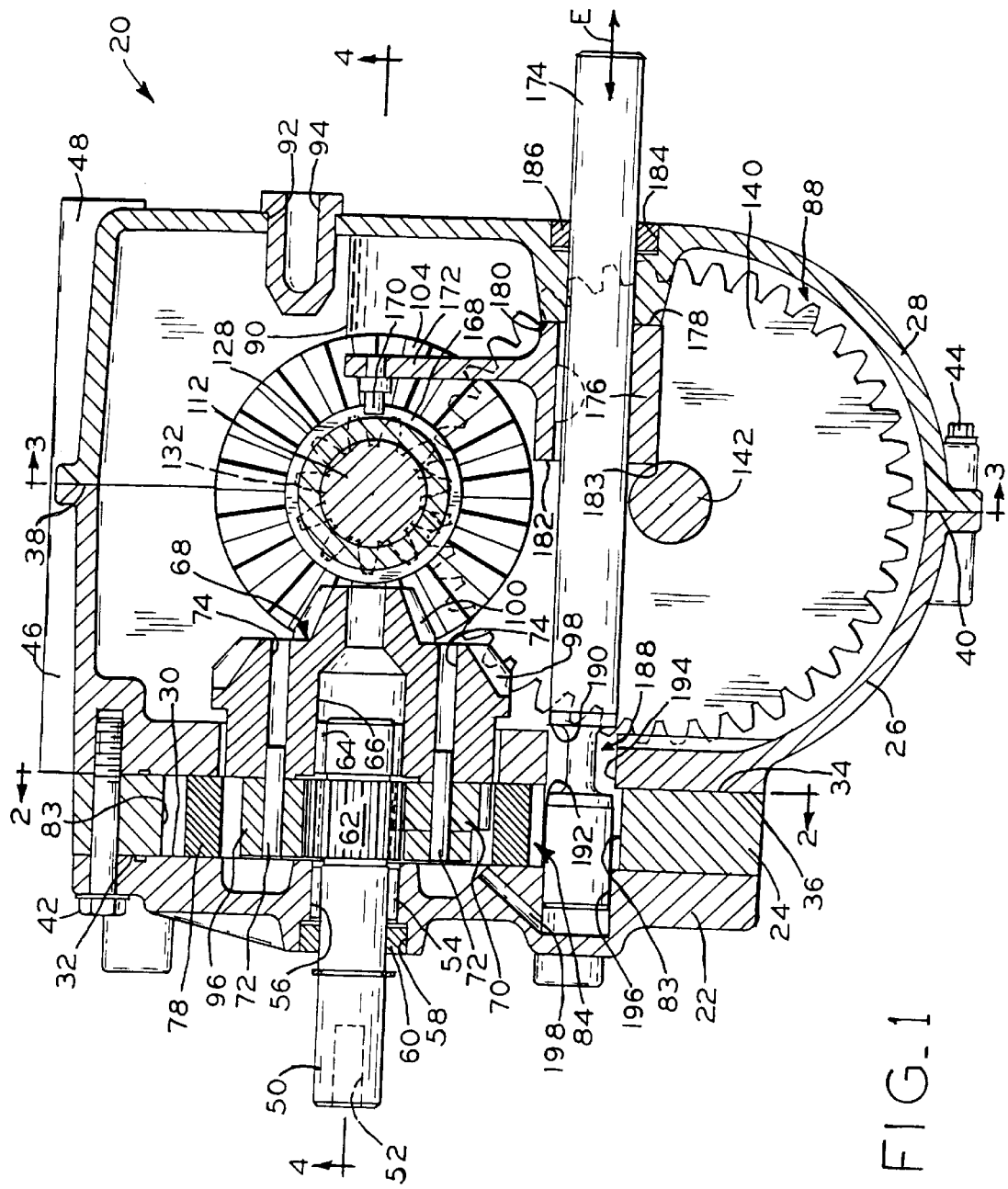
FIG_1

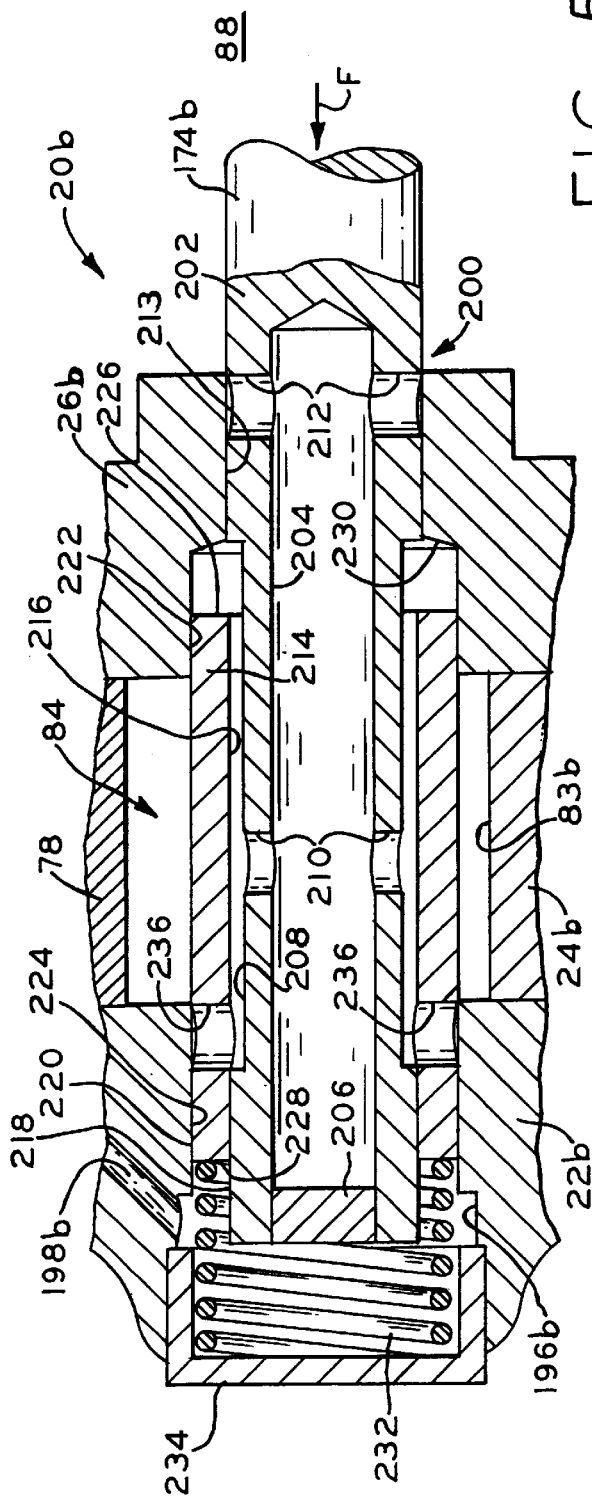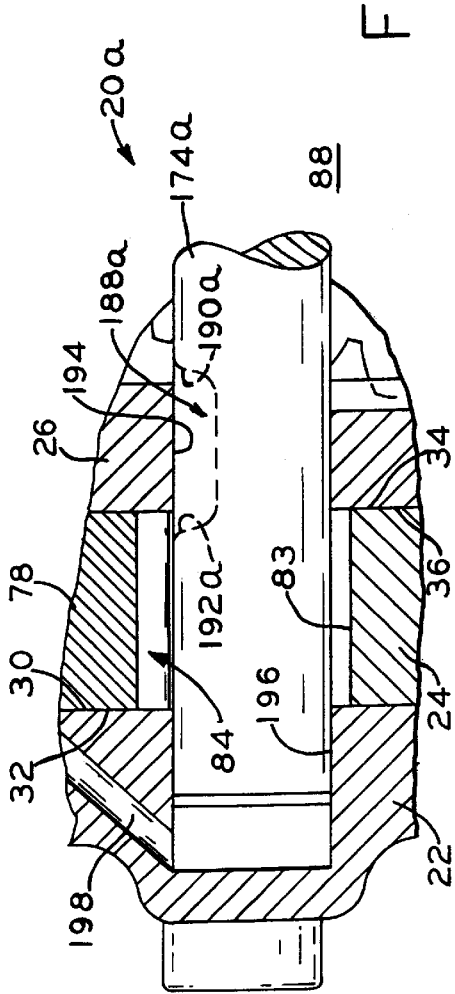

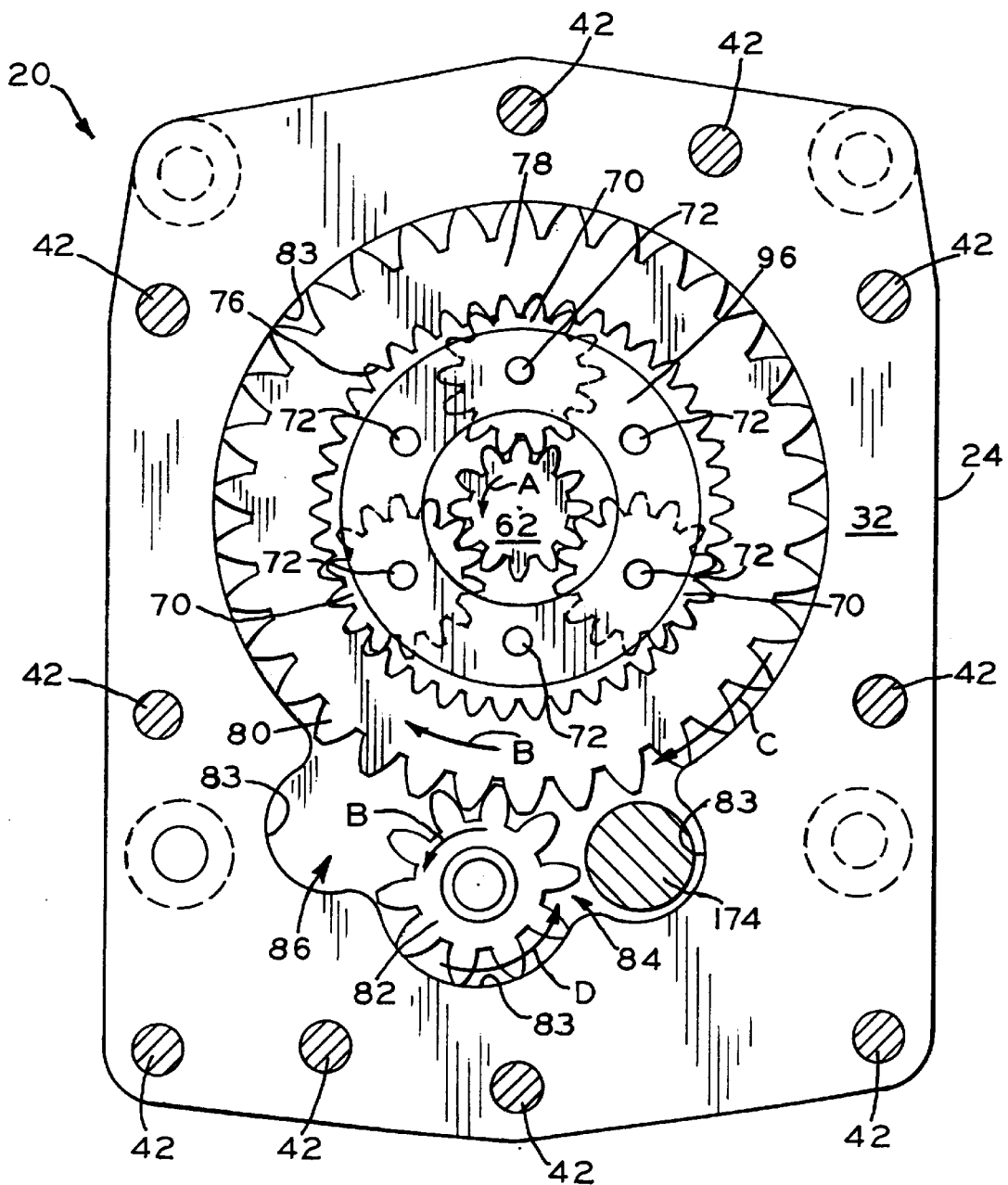
FIG_2

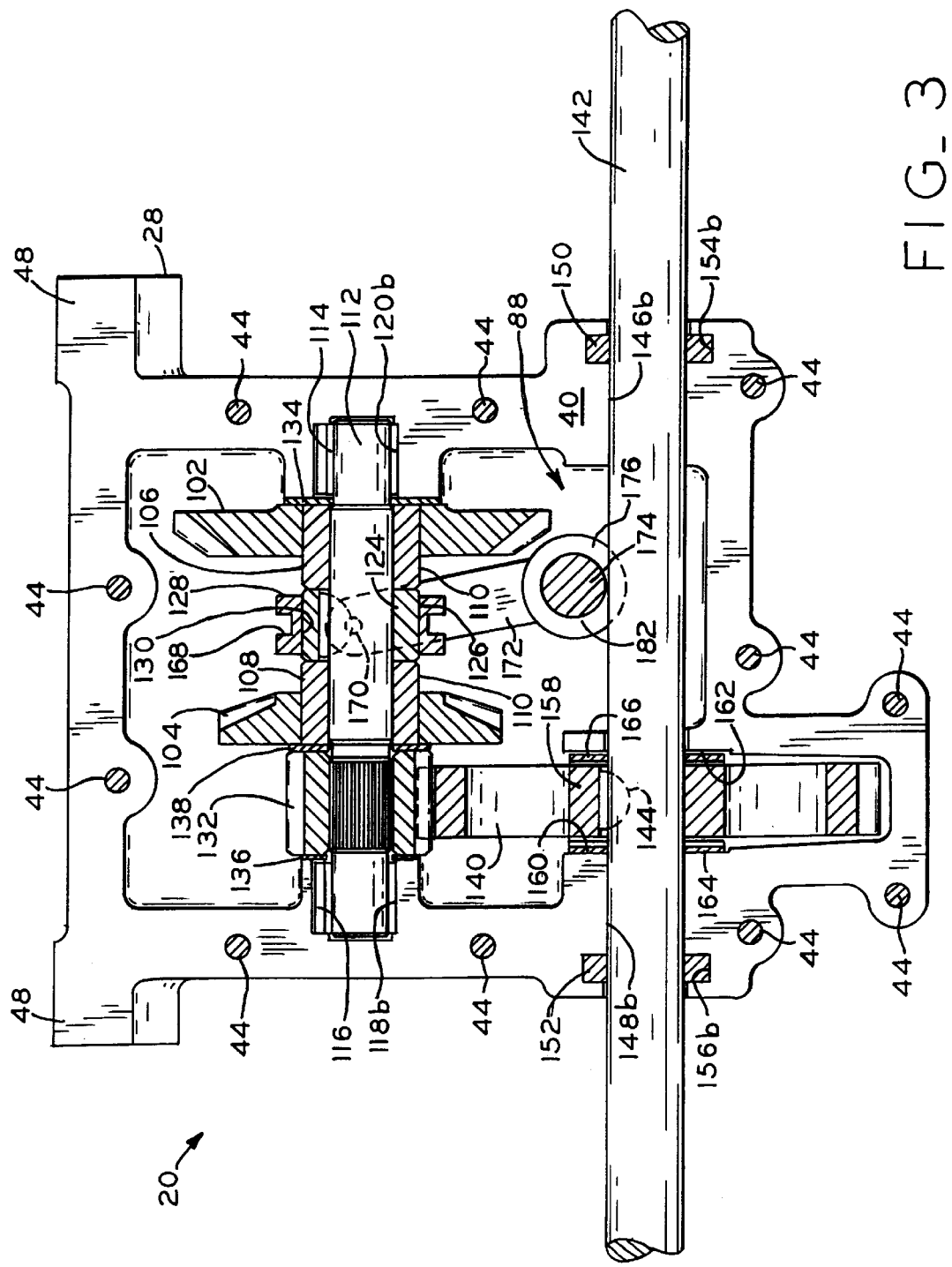
FIG_3

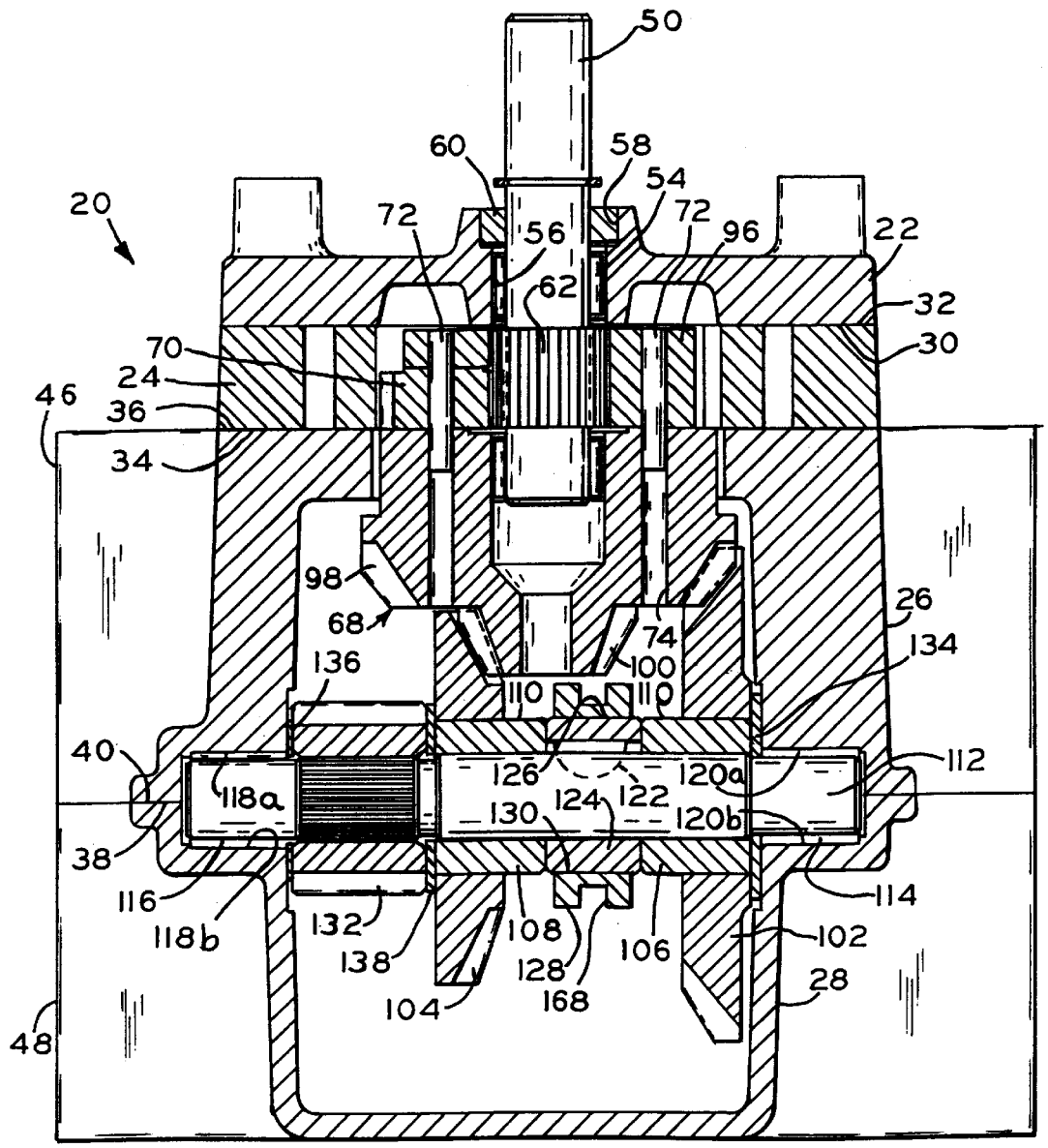
FIG_4

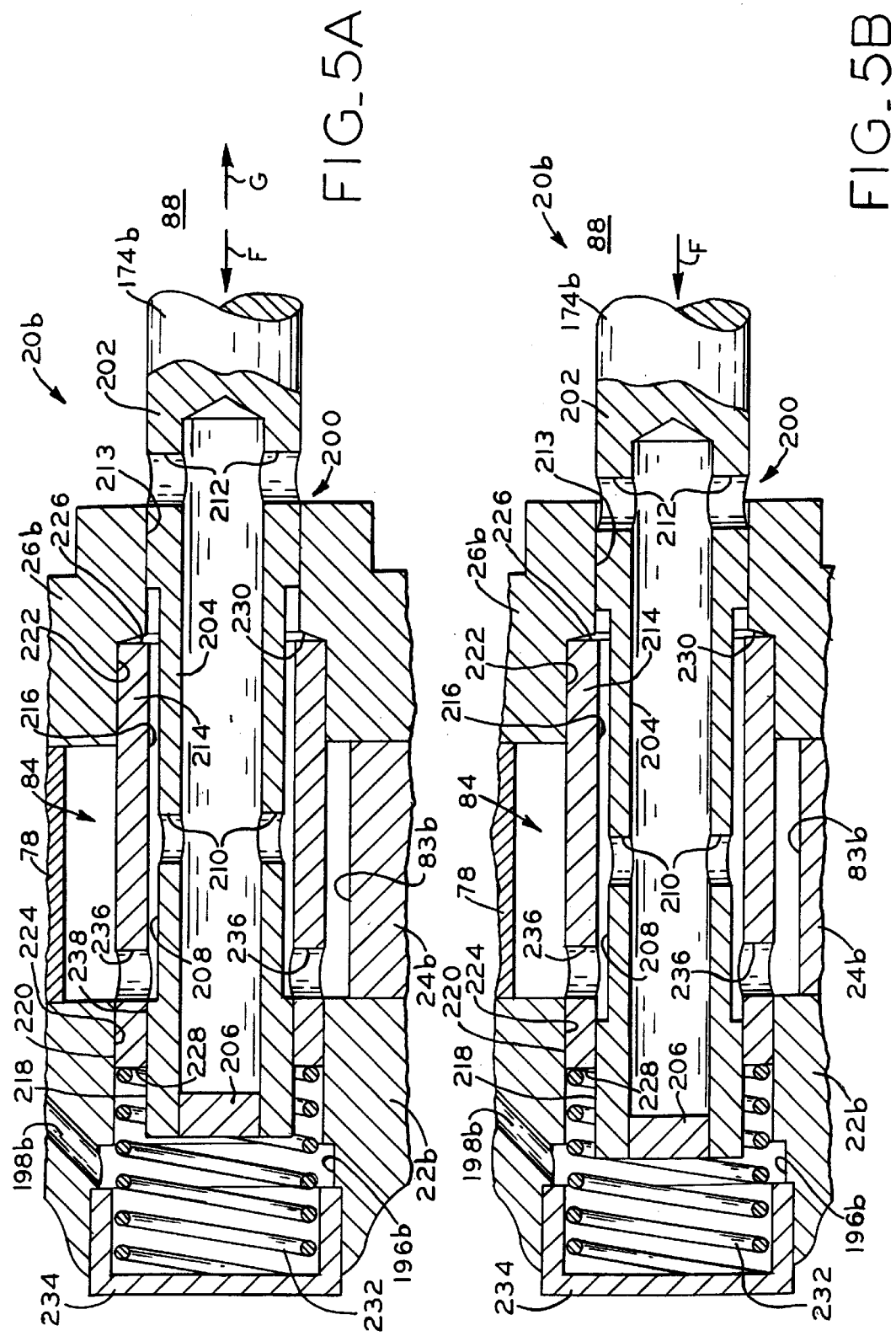

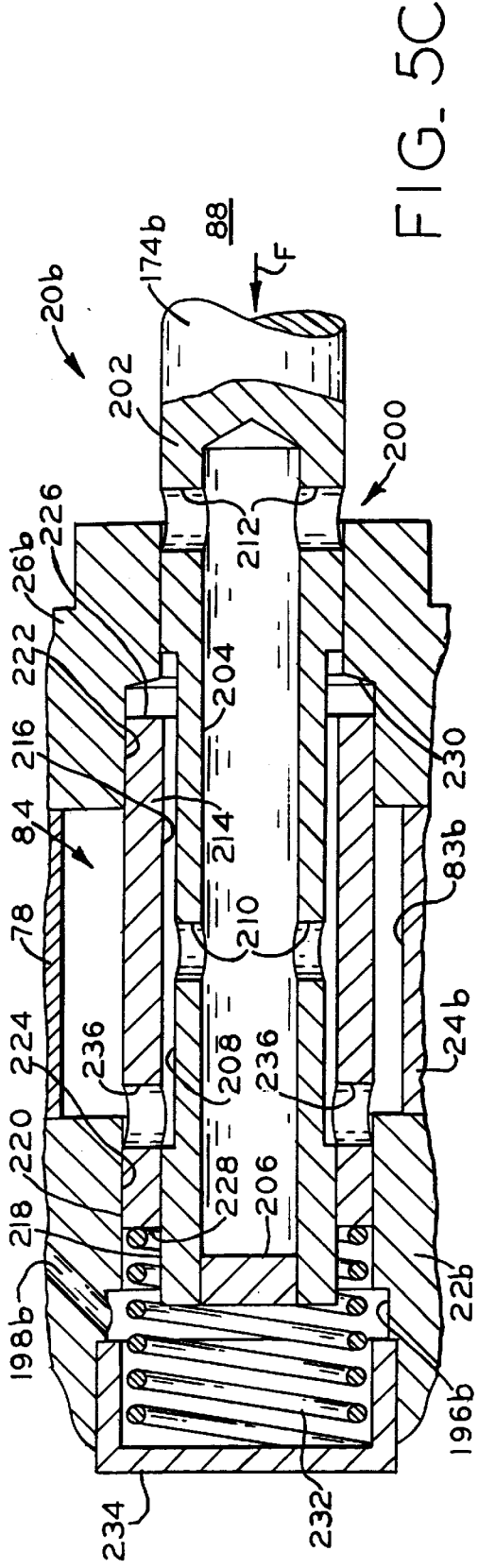

6,010,423

REVERSIBLE VARIABLE SPEED TRANSMISSION AND TRANSAXLE HAVING PRESSURE COMPENSATING FLOW METERING DEVICE

FIELD OF THE INVENTION

The present invention relates to variable speed transmissions or transaxles, and, in particular, to a hydromechanical transmission coupling the input shaft to the output shaft.

BACKGROUND OF THE INVENTION

Small vehicles or self-propelled lawn and garden implements, such as snow throwers, lawn mowers, lawn and garden tractors, and the like, include an energy source, such as an internal combustion engine, which provides power for rotatably driving an axle which is coupled to rotatably driven wheels. Typically, the energy source operates at a single, rotary mechanical speed. Yet, for practical reasons, the axle needs to be able to be rotatably driven at a variety of speeds in forward and reverse, and to be provided with a neutral mode. Accordingly, such vehicles may incorporate a transmission or transaxle which is used to convert the single speed, rotary mechanical motion of the energy source into a variety of output speeds.

Generally, a transmission comprises: a transmission input shaft which is operationally coupled to the energy source; a transmission output shaft, e.g., an axle in the case of a transaxle, which is operationally coupled to the elements, e.g., wheels, which are to be rotatably driven; and transmission componentry which operationally couples the transmission's input and output shafts. It is the transmission componentry which converts the single speed, rotary mechanical motion received from the energy source into a variety of output speeds for rotatably driving the output shaft.

A variety of forms of transmission componentry have been known in the art. For example, one embodiment of a transaxle which has been known in the art incorporates a clutch pedal and a gear shifting mechanism which are used to adjust the speed of the output shaft. Such transaxles require that the clutch be depressed in order to accomplish a change in direction and/or speed. In some instances, the vehicle or implement in which the transmission is installed must be completely stopped before a direction or speed change can be accomplished.

As an improvement to clutch controlled transmissions, various types of clutchless, variable speed transaxles have been developed which control output speed through a single lever. In a typical mode of operation, the lever is moved forward to move the vehicle in the forward direction or pulled backward to move the vehicle in the reverse direction. The farther forward or backward the lever is displaced, the faster the vehicle travels in the corresponding direction.

One form of variable speed transaxle now in use includes hydrostatic componentry in which a variable fluid drive transfers variable speed rotary motion to the output shaft through a mechanical gear train. Although reliable, such transmissions tend to be relatively heavy and large in size, require greater amounts of horsepower to operate which would otherwise be available for mower or other implement operation, and are relatively expensive to manufacture and install due to complex componentry.

Another form of transaxle includes friction drive componentry in which a traction wheel engages a drive disk. The traction wheel is moved radially across the center of rotation of the drive disk to vary output speed and/or direction. Such componentry, however, is unable to transfer large torque and, therefore, tends to slip within certain speed and/or load ranges. Moreover, such systems may require frequent servicing due to a lack of reliability.

Clutchless transmissions which control output speed entirely through mechanical means have also been proposed. A representative transaxle embodiment of this form is described, for example, in U.S. Pat. No. 4,726,256 (Von Kaler). This transaxle uses dual drive power input shafts for connection to a power source. The dual input shafts are parallel, rotate in the same direction, and are coupled to a planetary gear system incorporating a sun gear, planet gears, and a ring gear. The relative rotational speeds between the two input shafts cause the planet gears to revolve clockwise, counterclockwise, or remain motionless relative to the axis of the sun gear. The speed of revolution of the planet gears is transferred to the output shaft through an output gear assembly to which the planet gears are coupled. Thus, varying the relative rotational speed of the two input shafts is used to control the revolution speed and direction of the planet gears, and hence the rotational speed and direction of the output shaft.

The transaxle of U.S. Pat. No. 4,726,256 thus provides a variable speed transaxle in which dual transaxle input shafts are coupled to the transaxle output shaft by a mechanical drive train incorporating a planetary gear system. Such a transaxle offers the potential for highly efficient power transfer from the input shafts to the output shaft. Nonetheless, the need to always drive two different input shafts may adversely affect the maximum efficiency which could be achieved by the transaxle. Further, the transaxle uses mechanical means to provide a braking action for controlling engine speed, which increases the weight and mechanical complexity of the transaxle.

Different types of pumps may be incorporated into vehicle drive systems. One known type of pump includes an externally toothed pinion gear connected to its input shaft, and the pinion gear meshes with an epicyclic gear mechanism. As the fluid path through the pump changes, the rotation speed of the pinion gear and epicyclic gear mechanism changes. However, incorporation of this separate pump into a transaxle may increase the complexity and manufacturing costs of such a transaxle, and further may frustrate attempts to provide a sufficiently compact and conveniently sized transaxle for certain applications.

Accordingly, there remains a need in the art for a reliable, simple, economic, relatively compact, clutchless, rugged, durable, variable speed transaxle which provides forward, reverse, and/or neutral speed operation.

SUMMARY OF THE INVENTION

The present invention provides a variable speed transmission in which the transmission input shaft is coupled to the transmission output shaft by a mechanical drive train incorporating an epicyclic gear system which is braked using hydrostatic componentry to control the speed of the output shaft. As a result, the present invention provides an improved, epicyclic gear-based transmission or transaxle which is simple, efficient, reliable, easy to manufacture, compact, rugged, durable, clutchless, and capable of providing variable forward, reverse, and neutral speed operation. Further, the present invention provides a variable speed transmission in which in which the transmission input shaft is coupled to the transmission output shaft by a mechanical drive train incorporating an epicyclic gear system which is braked using hydrostatic componentry to control the speed of the output shaft, and provided with a pressure-compensating flow control device to maintain approximately constant drive wheel speeds regardless of fluctuations in the torsional axle load.

In one aspect, the present invention provides a variable speed, reversible transmission including a rotatable input member connectable to a drive source, a pump for pumping fluid through a conduit, a gear train including an epicyclic gear train operatively coupled to the input member and the pump, and a rotatable output member selectively operatively connected to either a forward or a reverse drive gear. The output member has a forward drive ratio corresponding with its connection to the forward drive gear and a different, reverse drive ratio corresponding with its connection to the reverse drive gear.

In another aspect, the present invention provides a variable speed, reversible transmission including a rotatable input member connectable to a drive source, a pump for pumping fluid through a conduit, a gear train including an epicyclic gear train operably coupled to the input member and the pump, a first gear operatively connected to the epicyclic gear train and having a first set of gear teeth, and a second gear operatively connected to the first gear and having a second set of gear teeth, the first and second sets of gear teeth having different numbers of gear teeth. A forward drive gear is intermeshed with the first set of gear teeth, a reverse drive gear is intermeshed with the second set of gear teeth, and a rotatable output member is selectively operatively connected to either the forward or reverse drive gears.

In yet another aspect, the present invention provides a variable speed transmission including a rotatable input member connectable to a drive source, a pump for pumping fluid through a conduit, a gear train including an epicyclic gear train operatively coupled to the input member and the gear pump, a rotatable output member selectively operably connected to the gear train, and a pressure compensating flow metering device for regulating the pressure of fluid flowing through the conduit and having a moveable outer member surrounding a movable inner member.

BRIEF DESCRIPTION OF THE DRAWINGS

The above mentioned and other features and advantages of this invention, and the manner of attaining them, will become more apparent and the invention itself will be better understood by reference to the following description of the embodiments of the invention taken in conjunction with the accompanying drawings, wherein:

FIG. 1 is a sectional side view of a first embodiment of a transaxle according to the present invention;

FIG. 1A is an enlarged, fragmentary sectional side view of a second embodiment of a transaxle according to the present invention;

FIG. 2 is a sectional view of the transaxle of FIG. 1, along line 2—2 thereof;

FIG. 3 is a sectional view of the transaxle of FIG. 1, along line 3—3 thereof;

FIG. 4 is a sectional bottom view of the transaxle of FIG. 1, along line 4—4 thereof;

FIG. 5A is a fragmentary sectional side view of a third embodiment of a transaxle according to the present invention, showing the pressure compensating flow metering device thereof in its neutral position;

FIG. 5B is the flow metering device of FIG. 5A, showing the inner spool thereof in a position intermediate its neutral position and a full speed drive position;

FIG. 5C is the flow metering device of FIG. 5A, showing the outer spool thereof moved to a partial flow restricting position;

FIG. 5D is the flow metering device of FIG. 5A, showing the outer spool thereof moved to a full flow restricting position;

FIG. 5E is the flow metering device of FIG. 5A, showing the inner spool thereof in a full speed drive position;

Figure 6A:
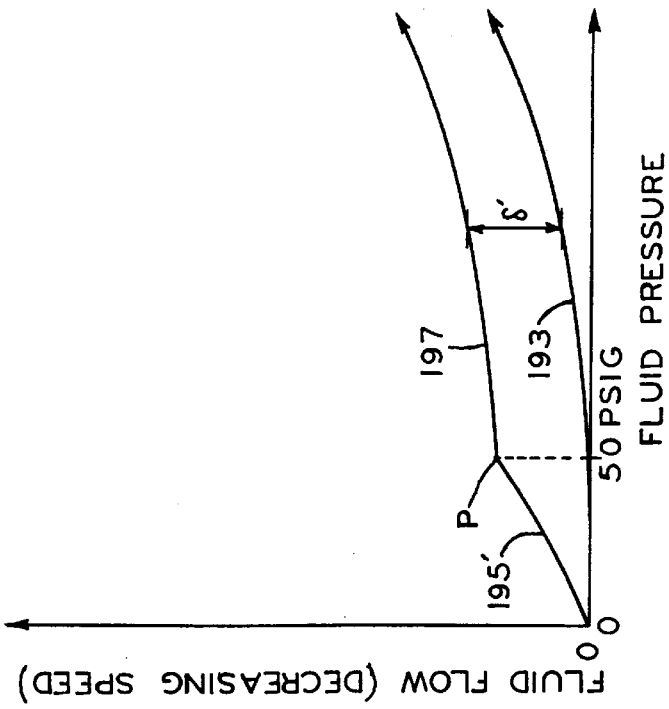
FIG. 6A is a graph qualitatively representing the correlation between the amount of fluid flow from the pump and the fluid pressure within the pump for a given control rod setting, in a transmission according the present invention without a pressure compensating flow metering device.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate different embodiments of the invention, and such exemplifications are not to be construed as limiting the scope of the invention in any manner.

DETAILED DESCRIPTION OF THE EMBODIMENT

The embodiments disclosed below are not intended to be exhaustive or limit the invention to the precise forms disclosed in the following detailed description.

Referring to FIG. 1 there is shown transaxle 20, first embodiment of a transmission according to the present invention. Transaxle 20 has a housing comprising cover plate 22, center plate 24, first housing portion 26 and second housing portion 28. Cover plate 22 has surface 30 which abuts surface 32 of center plate 24. Center plate 24 has, opposite surface 32, surface 34 which abuts surface 36 of first housing portion 26. First and second housing portions 26, 28 are joined at their respective, abutting surfaces 38, 40. Cover plate 22, center plate 24 and housing portion 26 are attached by means of a plurality of bolts 42, one of which is shown in FIG. 1. Likewise, first and second housing portions 26 and 28 are attached by a plurality of bolts 44, one of which is shown in FIG. 1.

First and second housing portions 26, 28 are respectively provided with engine mounting bosses 46, 48 on which an engine (not shown) may be mounted for driving the transmission. The engine may be attached to mounting portions 46, 48 by means of bolts engaged in threaded holes (not shown) provided therein. The engine is connectable to rotatable input shaft 50 by means of, for example, a belt drive system comprising a pulley (not shown) fixed to shaft 50 by means of a Woodruff key (not shown) disposed in keyway 52 or by any other conventional means by which power may be transferred from the engine to shaft 50. Input shaft 50 extends through cover plate 22 and is rotatably supported in bearing 54, which is disposed within bore 56 in cover plate 22. Outboard of bore 56, counter bore 58 is provided in cover plate 22, in which is disposed oil seal 60 which surrounds shaft 50 to prevent oil leakage past the input shaft. Shaft 50 is provided with sun gear portion 62 which is disposed between surfaces 32 and 34 of center plate 24. Shaft 50 is journalled in bearing 64 provided in centrally located recess 66 of double bevel gear 68. During normal operation of the implement into which transaxle 20 is installed, sun gear 62 rotates in a single direction, indicated by arrow A in FIG. 2, and at a generally constant speed.

In FIG. 2 it can be seen that sun gear 62 is intermeshed with a plurality of planet gears 70, each of which is rotatable about pin 72 which is interference-fitted into recess 74 (FIG. 1) provided in bevel gear 68. Circumferentially intermediate planet gears 70 are the legs of spider 96, which is also attached to bevel gear 68 by means of pins 72 interference-fitted into recesses 74. Spider 96 has portions intermediate its legs which are axially adjacent planet gears 70, each of which is provided with a bore which receives and radially supports the end of pin 72 about which a planet gear is rotatably disposed.

Planet gears 70 are also intermeshed with interior teeth 76 of ring gear 78. Ring gear 78 also has an outer set of teeth 80 which are intermeshed with the teeth of pinion gear 82, ring gear 78 and pinion gear 82 forming a gear pump with ring gear 78 as the driving gear and gear 82 as the driven gear. Those skilled in the art will recognize that a gerotor pump, or other type of pump, could alternatively be used in lieu of a gear pump. As seen in FIG. 2, gear 82 and ring gear 78 tend rotate in the direction of arrows B, thus carrying the incompressible, hydraulic oil in the directions of arrows C and D between their respective gear teeth and adjacent interior wall 83 of center plate 24 from gear pump inlet space 86, which is in unrestricted fluid communication with the interior sump portion 88 of the transmission housing, to gear pump outlet space 84. With oil allowed to unrestrictedly flow from space 84, the gear pump rotates at its maximum speed, driven by sun gear 62 through planet gears 70, which rotate in place about pins 72. With planet gears 70 rotating in place about pins 72, i.e., not revolving about sun gear 62, double bevel gear 68 will not be rotating and thus no power is transferred through the transmission. As the fluid passage from space 84 becomes restricted, however, the gear pump pressure will increase, creating a torque which will cause ring gear 78 to slow or stop. As ring gear 78 slows, planet gears 70 begin to "walk" about internal teeth 76 thereof, revolving about sun gear 62 and forcing pins 72 to revolve thereabout as well. It can be readily envisioned that planet gears 70 and their pins 72 are caused to revolve about sun gear 62 at increasing speed as the rotation of ring gear 78 slows, and that as pins 72 revolve about sun gear 62, double bevel gear 68 is caused to rotate in a single direction at a speed corresponding to the speed of revolution.

Gear pump inlet space 86 is disposed below the oil level 90 of the oil provided in the transmission (FIG. 1). The oil is provided to the interior of transaxle 20 through oil fill aperture 92, which is sealed with plug 94, and the interior of transaxle 20 is maintained at approximately atmospheric pressure. The hydraulic oil in sump 88 provides lubrication to the moving parts of transaxle 20 and serves as a medium by which the epicyclic gear train can be braked for transferring power from input shaft 50 to double bevel gear 68.

Double bevel gear 68 is provided with first set of bevel gear teeth 98 and second set of bevel gear teeth 100, with gear set 98 having a greater number of teeth than gear set 100. As best seen in FIG. 4, first set of gear teeth 98 is permanently intermeshed with forward drive gear 102. Similarly, on the opposite radial side of double bevel gear 86, second set of bevel teeth 100 are permanently intermeshed with reverse drive gear 104. Thus, drive gears 102 and 104 rotate in opposite directions. Each of drive gears 102, 104 is fixed to bushings 106, 108, respectively. Bushings 106 and 108 have external splines 110 and are rotatable about jack shaft 112. Jack shaft 112 is journalled at one end in bearing 114 and at the opposite end in bearing 116. Bearings 116 and 114 are respectively seated in mating recesses 118a, 118b and 120a, 120b in housing portions 26 and 28, respectively. Fixed to jackshaft 112, by means of Woodruff key 122 or by any other conventional means, is drive bushing 124, which is provided with external splines 126. Internally splined collar 128 slides axially along the axis of jack shaft 112, its internal splines 130 engaging both drive bushing splines 126 and splines 110 associated with either drive gear 102 or 104. Thus, by coupling drive bushing splines 126 with splines 110 through collar 128, torque is transferred from double bevel gear 68 to jack shaft 112. Notably, collar 128 may be centrally disposed entirely over drive bushing 124 such that collar splines 130 engage neither set of drive gear splines 110. In this position, the transmission is disengaged and no power may be transferred from the input shaft to the output shaft, as will be discussed further below.

Referring to FIG. 4, movement of collar 128 to the right of its shown position, such that its internal splines 130 engage both drive bushing splines 126 and splines 110 associated with forward drive gear 102, will cause jack shaft 112 to be driven in a first direction associated with forward travel of an implement such as, for example, a snow thrower, at a speed corresponding to the drive ratio between bevel gear teeth set 98 and forward drive gear 102. Similarly, movement of collar 128 to the left from its position shown in FIG. 4, such that its internal splines 130 engage both drive bushing splines 126 and splines 110 associated with reverse drive gear 104, will cause jack shaft 112 to be driven in a second direction associated with reverse implement travel, at a speed corresponding to the drive ratio between bevel gear teeth set 100 and reverse drive gear 104.

As shown in FIG. 4, leftwardly adjacent to reverse drive gear 104 and its bushing 108 is pinion gear 132, which is splined to jack shaft 112 and driven thereby. Intermediate forward drive gear 102 and its bushing 106, and the adjacent interior walls of housing portions 26, 28 is thrust bearing 134. Similarly, intermediate gear 132 and the adjacent interior walls of housing portions 26, 28 is thrust bearing 136. Further, intermediate reverse drive gear 104 and its bushing 108, and gear 132 is thrust bearing 138.

Referring now to FIG. 3, gear 132 is intermeshed with gear 140, which is fixed to axle 142. Gear 140 may be attached to axle 142 by means of Woodruff key 144 or by any other conventional means. At opposite ends of axle 142 are mounted wheels (not shown) which are driven by the axle for moving the implement. Axle 142 is journalled in mating recesses provided in housing portions 26 and 28. As shown in FIG. 3, these recesses are identified as 146b and 148b on opposite sides of the housing portion 28. The mating portions, 146a and 148a (not shown) are located in housing portion 26. Axle 142 is provided with annular oil seals 150 and 152 provided in recesses 154 and 156. As shown in FIG. 3, recesses 154b and 156b are located in housing portion 28; mating recess portions 154a and 156a (not shown) are located in housing portion 26.

As seen in FIG. 3, gear 140 is provided with hub portion 158 which is located between parallel, opposing interior housing walls 160, 162. Intermediate housing wall 160, 162 and the adjacent axial surface of gear hub 158, is thrust bearing 164, 166, respectively. Hence, axle 142 is restrained from axial movement relative to the transaxle housing.

Referring to FIGS. 3 and 4, it can be seen that the exterior surface of slidable collar 128 is provided with annular, central groove 168. Referring to FIGS. 1 and 3, it can be seen that groove 168 has engaged therein pin 170 which is attached to a lever 172, which pivots about the longitudinal axis of control rod 174 so as to slidably move collar 128 axially along the longitudinal axis of jack shaft 112 into engagement with bushings 106, 108 and drive bushing 124. Portion 176 of lever 172 surrounds control rod 174 and is keyed, by means of, for example, splines or, as shown, a Woodruff key, to rotate therewith while allowing control rod 174 to slide axially relative through lever 172. As shown in FIG. 1, lever portion 176 has first surface 178 which abuts annular surface 180 of housing part 28, and opposite, second surface 182, which is in sliding, abutting engagement with the cylindrical surface of axle 142 at point 183. Hence, lever 172 is restrained from moving axially along control rod 174. Further, as shown in FIG. 1, housing portion 28 is provided with aperture 184 in which control rod oil seal 186 is disposed.

Figure 6B:
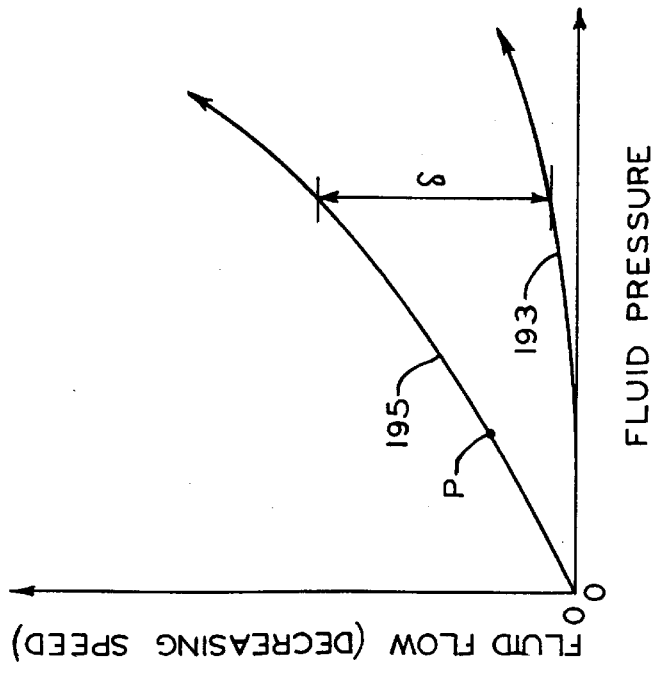
FIG. 6B is a graph qualitatively representing the correlation between the amount of fluid flow from the pump and the fluid pressure within the pump for a given control rod setting, in a transmission according to the present invention having a pressure compensating flow metering device.

Referring again to FIG. 1, the braking of ring gear 78 of the epicyclic gear train in transaxle 20 is controlled by axially moving control rod 174 in either of the directions shown by double headed arrow E. The cylindrical surface of control rod 174 is provided with annular recess 188 which provides a pair of shoulders 190, 192 past which the pumped oil flows from exit space 84 of the gear pump to the sump, although a certain quantity of fluid may leak under pressure from space 84 between interfitting components. Line 193 of FIGS. 6A and 6B qualitatively represent the correlation, at given control rod settings, between fluid flow from the pump via internal leakage paths and the pump fluid pressure. FIGS. 6A and 6B are discussed further below.

Annular recess 188 is of such width that it traverses beyond the length of conduit 194 provided in housing part 26, through which control rod 174 extends. Shoulders 190, 192 are provided with metering edges which may be chamfers, as shown, or, alternatively, a series of annular steps. These metering edges allow varying degrees of increasing fluid restriction as one of the shoulders moves towards conduit 194, ultimately sealing it in the rod's full speed drive position. FIG. 1A shows a portion of a second embodiment of a transmission according to the present invention. Transaxle 20a is identical to transaxle 20 except its has alternative control rod 174a. Control rod 174a is provided with recess 188a, which functions in the manner of annular recess 188 but which has the general form of a Woodruff key slot, which may be 3/16 inch wide has an axial length equivalent to the width of annular recess 188. Ends 190a, 192a of recess 188a are provided with metering edges which may be chamfers or a series of annular steps, as described above, for varying degrees of increasing fluid restriction as one of ends 190a, 192a moves towards conduit 194. Control rods 174 and 174a are otherwise identical. Whereas shoulders 190, 192 of rod 174 may interfere with the annular edges of conduit 194 during transaxle assembly, rod 174a substantially maintains a continuous cylindrical outer surface therealong, precluding any such interference and functions in an identical manner as rod 174. Further discussion below regarding rod 174 applies to rod 174a as well.

Control rod 174 is also in sliding engagement with the cylindrical surface of bore 196 in cover plate 22. Bore 196 is provided with vent 198 which communicates its terminal end with inlet space 86 of the gear pump so that control rod movement towards the left as viewed in FIG. 1 is not impeded by accumulated oil in the terminal end of bore 196.

With rod 174 positioned as shown in FIG. 1, the pumped oil may flow freely from space 84 past shoulder 192, through conduit 194 and annular recess 188, past shoulder 190 and into sump 188. In this control rod position, transaxle 20 is in its neutral mode, and the epicyclic gear train is not braked. Referring to FIG. 2, when in the neutral mode, ring gear 78 and gear 82 rotate at full speed, carrying oil from gear pump inlet space 86 along the paths defined by arrows C and D, and into the pump space 84, partly defined by interior center plate wall 83. As ring gear 78 rotates at full speed about sun gear 62, planet gears 70 idly rotate in place. It can be readily envisioned that when control rod 174 is moved in either of the directions indicated by double headed arrow E (FIG. 1), oil flow past shoulder 190 or 192 is restricted by its close proximity to the corresponding edge of conduit 194, thus restricting the oil flow through the conduit and increasing its pressure within pump exit space 84, retarding the rotation of ring gear 78, thereby causing planet gears 70 and pins 72 to revolve about rotating sun gear 62, imparting rotary motion in a single direction to double beveled gear 68, which in turn causes forward and reverse drive gears 102, 104 to rotate about jack shaft 112. By alternatively coupling gears 102 and 104 to jack shaft 112 by sliding collar 128 into engagement with drive bushing 124 and either bushing 106 or bushing 108, axle 142 is driven at variable speeds in the forward or reverse direction.

Returning to FIG. 1, it can be readily envisioned that extreme axial movement of control valve 174 in either direction indicated by double headed arrow E will completely block the flow of oil from the gear pump, except for that small amount which flows via internal leakage paths, as discussed above. In either of the two axially extreme control rod positions, transaxle 20 is in a full speed drive setting in which none of the oil is permitted to return to sump 88 from the gear pump and ring gear 78 is essentially completely stalled. In this position, planet gears 70 and pins 72 revolve at maximum speed, for a given input shaft rotation speed, about sun gear 62, and axle 142 rotates at its maximum forward or reverse speed.

In drive positions other than full speed drive, increased torsional loads on axle 142 causes double bevel gear 68 to slow down. As double bevel gear 68 slows down, causing the speed of revolution of planet gears 70 about sun gear 62 to also slow. The slowing of the revolution of planet gears 70 about sun gear 62 causes ring gear 78 to speed up, thereby forcing more oil to be pumped at higher pressure from gear pump exit space 84 through the controlling conduit restriction past one of shoulders 90 and 92, and to a small degree via internal leakage paths. Thus, in transaxle 20, in drive positions other than full speed drive, increases in torsional loading of axle 142 is met with a slowing down of the axle's rotational speed, albeit at increased torque. This arrangement may be particularly advantageous in an implement such as a snow thrower, for example, where it may be desirable to have the snow thrower slow as increasing heights of snow to be removed are encountered, thus preventing the auger from being overloaded, and for the snow blower to move at a faster speed under light loading conditions.

Referring to FIG. 6A, which illustrates the qualitative correlation between the fluid flow from the pump and the pump pressure, for a given control rod setting between its neutral and full speed drive positions in a transmission such as transaxle 20, 20a not having a pressure compensating flow metering device, curve 195 represents the total fluid flow through conduit 194 and through internal leakage paths, the latter represented by curve 193 as stated above. Difference δ, which varies with pump fluid pressure, is the part of the fluid which flows through conduit 94 (and recesses 188, 188a) in transaxles 20, 20a. As pressure increases within the pump, the total fluid flow therefrom exponentially increases, the larger part of the increasing total flow through conduit 94, i.e., δ exponentially increases with pump pressure. In the control rod's full speed drive position (s), δ is essentially zero, for virtually no fluid flows through conduit 94. In this position curves 193 and 195 are substantially superimposed.

A third embodiment of a transmission according to the present invention, transaxle 20b, is shown, in relevant part, in FIGS. 5A through 5E. Transaxle 20b is identical to transaxles 20 and 20a in all respects except as shown in FIGS. 5A through 5E, where corresponding elements between these embodiments are similarly referenced. In lieu of the gear pump oil flow control means described above, comprising recesses 188 or 188a, transaxle 20b is provided with pressure compensating flow metering device 200. Device 200 provides transaxle 20b with a means of limiting the flow of fluid from the pump, through other than internal leakage paths, once pump fluid pressure reaches a certain level. Referring to FIG. 6B, which illustrates the qualitative correlation between the fluid flow from the pump and the pump pressure, for a given control rod setting between its neutral and full speed drive positions, in a transmission such as transaxle 20b having pressure compensating flow metering device 200, curve 195' represents the total fluid flow through device 200 and through internal leakage paths, the latter represented by curve 193, up to a device-actuating pump pressure of, for example, 50 psig. This pressure is used throughout the following descriptions of the present invention for illustrative purposes only, and the scope of the present invention should not be construed as being limited in any way by reference to this exemplary pressure. Between the graph's origin 0,0 and point P, curves 195 and 195' of FIGS. 6A and 6B are identical. After the device-actuating pump pressure is reached, however, device 200 maintains the difference between total fluid flow curve 197 and internal leakage curve 193 at approximately constant value δ' as pump fluid pressure increases beyond 50 psig. In the control rod's full speed drive position (FIG. 5E), δ' is essentially zero, for virtually no fluid flows through the conduit of device 200. In this position curves 193 and 195', 197 are substantially superimposed. The pressure compensating flow metering device of transaxle 20b is now described:

Device 200 comprises cylindrical inner spool 202 which is integrally formed in control rod 174b, which is axially and rotationally movable in much the same way as are control rods 174, 174a. In changing the transmission from the neutral position to the full speed drive position, control rod 174b may be moved towards the left, in the direction of arrow F, from its neutral position shown in FIG. 5A, to its full speed drive position shown in FIG. 5E. An intermediate speed drive control rod position is shown if FIGS. 5B–5D. In any control rod 174b position between those shown in FIGS. 5A and 5E, device 200 provides a pressure compensation function to control the amount of flow from the pump through device 200 once pump fluid pressure reaches a certain level, e.g., 50 psig. Further, as will be discussed below, control rod 174b may be moved to the right, in the direction of arrow G (FIG. 5A), from its neutral position shown in FIG. 5A to a partial or full speed drive position, although such control rod movement affords no pressure compensation function.

Inner spool 202 is provided with axial bore 204 which is provided with terminal plug 206, cross bores 210 which communicate bore 204 with wide annular groove 208, and radial fluid exhaust ports 212 which variably communicate bore 204 with transaxle oil sump 88. In the neutral control rod position (FIG. 5A), as well as drive positions to the right thereof, in the direction of arrow G, flow through exhaust ports 212 is not restricted; in the full speed drive position (FIG. 5E), ports 212 are completely blocked. Inner spool 202 slidably engages inner cylindrical surface of bore 213 provided in first housing portion 26b. Flow metering device 200 further comprises cylindrical outer spool 214 surrounding inner spool 202. Outer spool 214 has cylindrical inner surface 216 which slidably engages cylindrical outer surface 218 of inner spool 202, and has cylindrical outer surface 220 which slidably engages cylindrical inner surfaces 222 of housing portion 26b and 224 of cover plate 22b. Outer spool 214 also has annular axial surfaces 226 and 228, annular surface 226 shown in FIG. 5A as having an abutting relationship with the annular outer edge of the face of frustoconical counterbore 230 provided in housing part 26b. Frustoconical counterbore 230 allows the entirety of annular axial face 226 of outer spool 214 to be exposed to oil pressure, as will be described further below. Alternatively, it is envisioned counterbore 230 may have a face which is perpendicular to cylindrical surface 222 rather than being frustoconical as shown. Manufacturing imperfections in the perpendicular counterbore face and abutting axial face 226 of outer spool 214 may provide sufficient clearances for substantially all of face 226 to be exposed to oil pressure.

Annular surface 228 of outer spool 214 is abutted by spring 232, which is retained in cover plate bore 196b by means of cup 234 interference-fitted or, alternatively, threadedly engaged thereinto. Bore 196b is provided with vent 198b through which bore 196b fluidly communicates with gear pump oil inlet space 86 (FIG. 2). Outer spool 214 is further provided with radial ports 236 which, in the outer spool position shown in FIG. 5A, provide unrestricted fluid communication between pump exit space 84 and inner spool bore 204 via annular groove 208 and radial ports 210. Spring 232 is sized such that outer spool 214 will maintain its position in abutting relationship with frustoconical counterbore 230 at gear pump outlet oil pressures of up to approximately 50 psig, above which the oil pressure exerted on annular surface 226 will begin to move outer spool 214 leftward as viewed in FIGS. 5A through 5E against the force of spring 232, thus closing ports 236, as will be discussed further below.

In the control rod 174b position shown in FIG. 5A, where exhaust ports 212 and the inlets and outlets of ports 236 are fully open, the oil flow from pump exit space 84 through outer spool radial bores 236, inner spool annular groove 208, cross bores 210, interior bore 204 and exhaust ports 212, which form a fluid conduit, is unrestricted, for the pressure acting on annular surface 226 of outer spool 214 does not reach the 50 psig device actuation pressure required to overcome the force of spring 232. In this neutral position, the gear pump is not braked and, as described above, the planet gears idly rotate in place and do not revolve about the sun gear.

FIG. 5B shows control rod 174b moved leftward from the neutral position of FIG. 5A to one of several positions in which the flow through exhaust ports 212 is partly restricted by the cylindrical inner surface of housing bore 213. In this position, the oil flow from pump exit space 84 through outer spool radial bores 236, inner spool annular groove 208, cross bores 210, interior bore 204 and exhaust ports 212 is partly restricted, and the oil pressure within the conduit is increased. As shown in FIG. 5B, however, the oil pressure in the conduit and exposed to outer spool annular surface 226 is less than that necessary to overcome the force of spring, e.g. 50 psig, and unobstructed fluid communication between pump space 84 and inner spool 202 is continued.

With reference now to FIG. 5C, in which inner spool 202 is shown at its partly restricted position of FIG. 5B, increased torsional loading on axle 142, which acts through the gear train to slow double bevel gear 68 and the revolution of planet gears 70 about sun gear 62, causes ring gear 78 to rotate faster, increasing the speed of the gear pump and the pressure of the oil pumped thereby to above 50 psig. The increased oil pressure acting on outer spool surface 226 causes outer spool to move leftward as shown, against the force of spring 232, and radial ports 236 to be obstructed by inner cylindrical surface 224. Moving on now to FIG. 5D, further increases in pump oil pressure has forced outer spool 214 further towards the left, such that radial ports 236 are completely blocked by cylindrical surface 224, and oil is prevented from exiting pump space 84 through the conduit of device 200. Because oil cannot exit space 84 through device 200, the pressure therein rises to the point where the gear pump is essentially completely blocked and ring gear 78 slows, which causes planet gears 70 to revolve faster about sun gear 62, and double bevel gear 68 and axle 142 to speed up. Concurrent with the increase in oil pressure in space 84, the oil pressure exerted on outer spool surface 226 decreases, and outer spool 214 is moved rightward under the force of spring 232, opening fluid communication between pump exit space 84 and inner spool 202. Thus, the oil pressure within annular groove 208 is maintained at a constant average pressure corresponding to about 50 psig, with outer spool 214 continually cycling between a rightward position (FIG. 5B) and a leftward position (FIG. 5D); and the oil flow through the conduit is maintained at a substantially constant level $\delta'$ (FIG. 6B) at a given control rod position. In this way, at each of the control rod positions between the neutral position of FIG. 5A and the full speed drive position of FIG. 5E, the oil flow from the pump, at pressures above 50 psig, is held generally constant irrespective of gear pump pressure in space 84, varying only with changes in fluid flow through internal leakage paths. Thus, in transaxle 20b, the rotational speed of ring gear 78 is not as susceptible to changing with fluctuations in the torsional axle load vis-a-vis transaxles 20, 20a.

Referring now to FIG. 5E, inner spool 202 is moved to its leftmost position in which radial exhaust ports 212 are completely blocked. In this position, transaxle 20b is in its full speed drive setting in which none of the oil is returned via the conduit of device 200 to sump 88 from the gear pump, i.e., $\delta'$ is zero; in this position ring gear 78 is virtually completely stalled, save flow therefrom through internal leakage paths which may allow ring gear rotation at negligibly low speeds. In this position, planet gears 70 and pins 72 revolve at maximum speed, for a given input shaft rotation speed, about sun gear 62, and axle 142 rotates at its maximum forward or reverse speed. In this control rod position, outer spool 214 may assume the position shown in FIG. 5E, with its ports 236 closed to pump exit space 84, or may be in a full or partially open position, or move between any of these positions. Regardless of the position of outer spool 214, because oil is prevented from flowing through exhaust ports 212 from device 200, the pump will remain essentially completely stalled and maximum transmission speed will be virtually maintained, save for speed reductions corresponding to pump pressure due to internal fluid leakage from the pump, as represented by curve 193 of FIG. 6B.

Thus, in transaxle 20b, in any control rod position between that shown in FIG. 5A and that shown in FIG. 5E, in which a pressure compensating function occurs, the transmission's output speed is not perceptibly affected by fluctuations in torsional loads on the axle. For example, in contrast to a snow thrower having transaxle 20 or 20a, a snow thrower having transaxle 20b would substantially maintain its wheel speed regardless of the depth of snow encountered.

As mentioned above, control rod 174b may be moved rightward from its neutral position shown in FIG. 5A, in the direction of arrow G. With reference now to FIG. 5A, it can be readily envisioned that as the control rod is moved rightward, cylindrical surface 238 of inner spool 202 adjacent the leftmost end of annular groove 208 begins to cover the outlets of radial ports 236 provided in outer spool 214. Annular surface 226 of outer spool 214 remains in abutting engagement with surface 230, for no oil pressure increase occurs within the conduit of device 200. As ports 236 are covered by cylindrical inner spool surface 238, the pressure in pump outlet space 84 increases, slowing the rotation of ring gear 78 in the manner described above with respect to transaxles 20, 20a. Thus, if control rod 174b is moved rightward in the direction of arrow G, device 200 will function much as the flow control means of transaxles 20, 20a. No pressure compensating function will occur, and the flow and pump pressure correlation of FIG. 6A will apply for control rod positions between neutral and full speed drive (rightmost position).

Figure 7:
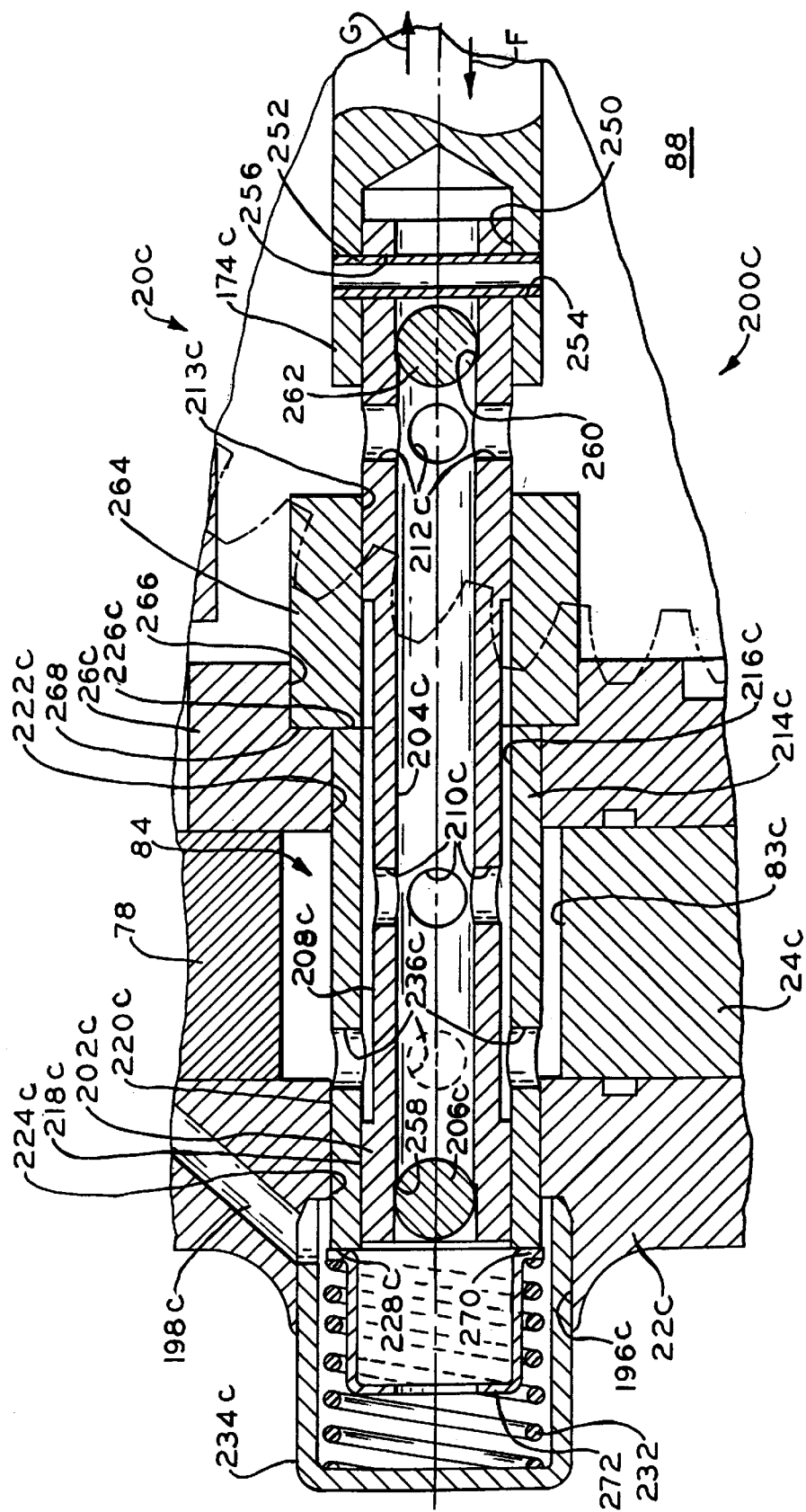
FIG. 7 is an enlarged, fragmentary sectional side view of a fourth embodiment of a transaxle according to the present invention, showing the pressure compensating flow metering device thereof in a neutral position.

FIG. 7 shows a fourth embodiment of a transmission according to the present invention. Transaxle 20c is identical to transaxle 20b in all respects except as shown in FIG. 7, which details the structure of pressure compensating flow metering device 200c, which is similar and functionally identical to device 200 described above. In FIG. 7 and the following description of device 200c, corresponding elements between transaxles 20b and 20c, and devices 200 and 200c, are similarly referenced.

Device 200c comprises cylindrical inner spool 202c which is attached within axial bore 250 of control rod 174c by means of rollpin 252 extending through cross bores 254, 256 provided through rod 174c and spool 202c, respectively. Rod 174c is axially and rotationally movable in much the same way as the above-described control rods. In the manner described above with respect to transaxle 20b, in changing the transaxle 20c from the neutral position to the full speed drive position, control rod 174c may be moved towards the left, in the direction of arrow F, from its neutral position shown in FIG. 7, which corresponds to FIG. 5A, to its full speed drive position (not shown) which corresponds to that shown in FIG. 5E. In any control rod 174c position therebetween, device 200c provides a pressure compensation function to control the amount of flow from the pump through device 200c once pump fluid pressure reaches a certain level, e.g., 50 psig, as described above with respect to device 200. Further, in the manner discussed above with respect to device 200, control rod 174c may be moved to the right, in the direction of arrow G, from its neutral position shown in FIG. 7 to a partial or full speed drive position. As indicated above, such control rod movement affords no pressure compensation function; rather, device 200c will function in a way similar to the fluid control means of transaxles 20, 20a.

Inner spool 202c is provided with axial bore 204c which extends therethrough. Bore 204 is counterbored at its opposite ends, providing annular seats 258, 260 against which balls 206c, 262 abut. Balls 206c, 262 are interference fitted into their respective counterbores and serve as plugs for the terminal ends of bore 204c. Inner spool 202c is also provided with cross bores 210c which communicate bore 204c with wide annular groove 208, and radial fluid exhaust ports 212c which variably communicate bore 204c with transaxle oil sump 88. In the neutral control rod 174c position shown in FIG. 7, as well as drive positions to the right thereof, in the direction of arrow G, flow through exhaust ports 212c is not restricted. As inner spool 202c is moved in the direction of arrow F into its leftmost position, ports 212c are completely blocked by adjacent bore 213c of collar 264, which is interference fitted or threadedly received in a mating fitting 266 provided in first housing portion 26c. Inner spool 202c slidably engages inner cylindrical surface of bore 213c provided in collar 264. Flow metering device 200c further comprises cylindrical outer spool 214c surrounding inner spool 202c. Outer spool 214c has cylindrical inner surface 216c which slidably engages cylindrical outer surface 218c of inner spool 202c, and has cylindrical outer surface 220c which slidably engages cylindrical inner surfaces 222c of housing portion 26c and 224c of cover plate 22c. Outer spool 214c also has annular axial surface 226c which abuts surface 268 of collar 264, and opposite annular axial surface 228c to which is attached flange 270 of cup 272. Collar surface 268 is perpendicular to cylindrical surface 222c, and manufacturing imperfections provide sufficient clearances for substantially all of face 226c to be exposed to oil pressure, as described above with respect to device 200.

Flange 270 of cup 272 is abutted by spring 232, which is retained in cover plate bore 196c by means of cup 234c interference-fitted or, alternatively, threadedly engaged thereinto. Bore 196c is provided with vent 198c through which bore 196c fluidly communicates with gear pump oil inlet space 86 (FIG. 2). Outer spool 214c is further provided with radial ports 236c which, in the outer spool position shown in FIG. 7, provide unrestricted fluid communication between pump exit space 84 and inner spool bore 204c via annular groove 208c and radial ports 210c. Spring 232 is sized such that outer spool 214c will maintain its position in abutting relationship with collar surface 268 at gear pump outlet oil pressures of up to approximately 50 psig. As described above with respect to device 200, above pump pressures of 50 psig, oil pressure exerted on annular surface 226c will begin to move outer spool 214c leftward as viewed in FIG. 7, against the force of spring 232, thus closing ports 236c, in the manner described above to provide the pressure compensation pressure for controlling the amount of flow from the pump through device 200c once pump fluid pressure reaches 50 psig.

While this invention has been described as having exemplary designs, the present invention may be further modified in the spirit and scope of this disclosure. Therefore, this application is intended to cover any variations, uses, or adaptations of the invention using its general principles. For example, rather than the present invention being applied to a transaxle, the present invention may instead be applied to a transmission having an input and one or more output shafts which are not axles. Further, this application is intended to cover such departures of the present disclosure as come within known or customary practice in the art to which this invention pertains.

What is claimed is:

1. A variable speed, reversible transmission comprising:
a rotatable input member connectable to a drive source;
a pump for pumping fluid through a conduit and having an input;
a gear train comprising an epicyclic gear train operatively coupled to said input member and said pump input; and
a rotatable output member selectively operatively connected to one of a forward and a reverse drive gear;
wherein said output member has a forward drive ratio corresponding with its connection to said forward drive gear and a reverse drive ratio corresponding with its connection to said reverse drive gear, said forward drive ratio different than said reverse drive ratio.

2. The transmission of claim 1, having a neutral position wherein said output member is selectively operatively connected to neither said forward nor said reverse drive gear.

3. The transmission of claim 1, wherein said pump is a gear pump.

4. The transmission of claim 1, wherein transmission is a transaxle.

5. The transmission of claim 1, wherein said forward and said reverse drive gears are rotatable about a common shaft and selectively operatively connected to said common shaft.

6. The transmission of claim 5, wherein said common shaft is operatively connected to said output member.

7. The transmission of claim 1, further comprising means for selectively operatively connecting one of said forward and said reverse drive gears to said output member.

8. The transmission of claim 7, wherein said means for selectively operatively connecting comprises a collar operatively connected to said output member, said collar slidable to a position in which one of said forward and said reverse drive gears is operatively connected to said output member.

9. The transmission of claim 1, further comprising control means for regulating the flow of fluid pumped through said conduit.

10. The transmission of claim 9, wherein said control means comprises a control rod slidably disposed in said conduit, said control rod moveable between a fist position, in which said pump and a fluid reservoir are in fluid communication, and a second position in which said pump and said reservoir are out of fluid communication.

11. The transmission of claim 10, wherein said control rod is rotatable and further comprising a lever attached to and rotatable with said control rod, said lever operatively connected to a slidable collar, said rotatable output member selectively operatively connected to one of said forward and said reverse drive gears through said collar.

12. A variable speed, reversible transmission comprising:
a rotatable input member connectable to a drive source;
a pump for pumping fluid through a conduit and having an input;
a gear train comprising an epicyclic gear train operably coupled to said input member and said pump input;
a first gear operatively connected to said epicyclic gear train and having a first set of gear teeth;
a second gear operatively connected to said first gear and having a second set of gear teeth, said first and second sets of gear teeth having different numbers of gear teeth;
a forward drive gear in meshed engagement with said first set of gear teeth;
a reverse drive gear in meshed engagement with said second set of gear teeth; and
a rotatable output member selectively operatively connected to one of said forward and said reverse drive gears.

13. The transmission of claim 12, wherein said pump is a gear pump.

14. The transmission of claim 12, wherein said first gear and said second gear comprise a double bevel gear, said first and said second sets of gear teeth each comprising separate bevel gear portions of said double bevel gear.

15. The transmission of claim 12, having a neutral position wherein said output member is selectively operatively connected to neither said forward nor said reverse drive gear.

16. The transmission of claim 12, wherein said transmission is a transaxle.

17. The transmission of claim 12, wherein said forward and said reverse drive gears are rotatable about a common shaft and selectively operatively connected to said common shaft.

18. The transmission of claim 17, wherein said common shaft is operatively connected to said output member.

19. The transmission of claim 12, further comprising means for selectively operatively connecting one of said forward and said reverse drive gears to said output member.

20. The transmission of claim 19, wherein said means for selectively operatively connecting comprises a collar operatively connected to said output member, said collar slidable to a position with which one of said forward and said reverse drive gears is operatively connected to said output member.

21. The transmission of claim 12, further comprising control means for regulating the flow of fluid pumped through said conduit.

22. The transmission of claim 21, wherein said control means comprises a control rod slidably disposed in said conduit, said control rod movable between a first position in which said pump and a fluid reservoir are in fluid communication, and a second position in which said pump and said reservoir are out of fluid communication.

23. The transmission of claim 22, wherein said control rod is rotatable and further comprising a lever attached to and rotatable with said control rod, said lever operatively connected to a slidable collar, said rotatable output member selectively operatively connected to one of said forward and said reverse drive gears through said collar.

24. A variable speed transmission comprising:
   a rotatable input member connectable to a drive source;
   a pump for pumping fluid through a conduit and having an input;
   a gear train comprising an epicyclic gear train operatively coupled to said input member and said pump input;
   a rotatable output member selectively operably connected to said gear train; and
   a pressure compensating flow metering device for regulating the pressure of fluid flowing through said conduit, said device having a moveable outer member surrounding a movable inner member.

25. The transmission of claim 24, wherein said pump is in fluid communication with a fluid reservoir through said flow metering device.

26. The transmission of claim 25, wherein said flow metering device inner member is moveable between a first position in which said pump and said reservoir are in unrestricted fluid communication, and a second position in which said pump and said reservoir are out of fluid communication.

27. The transmission of claim 26, wherein fluid communication between said pump and said reservoir is variably restricted between said first and said second inner member positions.

28. The transmission of claim 24, wherein said flow metering device outer member has a cavity, said inner member slidably disposed in said cavity, a first port fluidly communicating said cavity and said pump, a first surface and an opposed second surface.

29. The transmission of claim 28, where in said outer and said inner members are cylindrical, said inner member having an annular groove formed in the outer cylindrical surface thereof, said groove in communication with said first port.

30. The transmission of claim 28, wherein said flow metering device inner member has an interior passage, a second port fluidly communicating said outer member cavity and said interior passage, and a third port fluidly communicating said interior passage and a fluid reservoir.

31. The transmission of claim 30, wherein said flow metering device further comprises a spring abutting said first outer member surface, said outer member urged by said spring into a first position in which said inner member interior passage and said pump are in unrestricted fluid communication via said first and said second ports, said outer member urged by fluid pressure on said second surface into a second position in which said inner member interior passage and said pump are out of fluid communication.

32. The transmission of claim 31, wherein fluid communication between said pump and said cavity is variably restricted between said first and said second outer member positions.

33. The transmission of claim 24, wherein said transmission is reversible.

34. The transmission of claim 24, wherein said transmission is a transaxle.

* * * * *